Feb. 13, 1940.  R. M. JOYCE  2,190,565
SLIP-STREAM MIXER
Filed Feb. 10, 1939
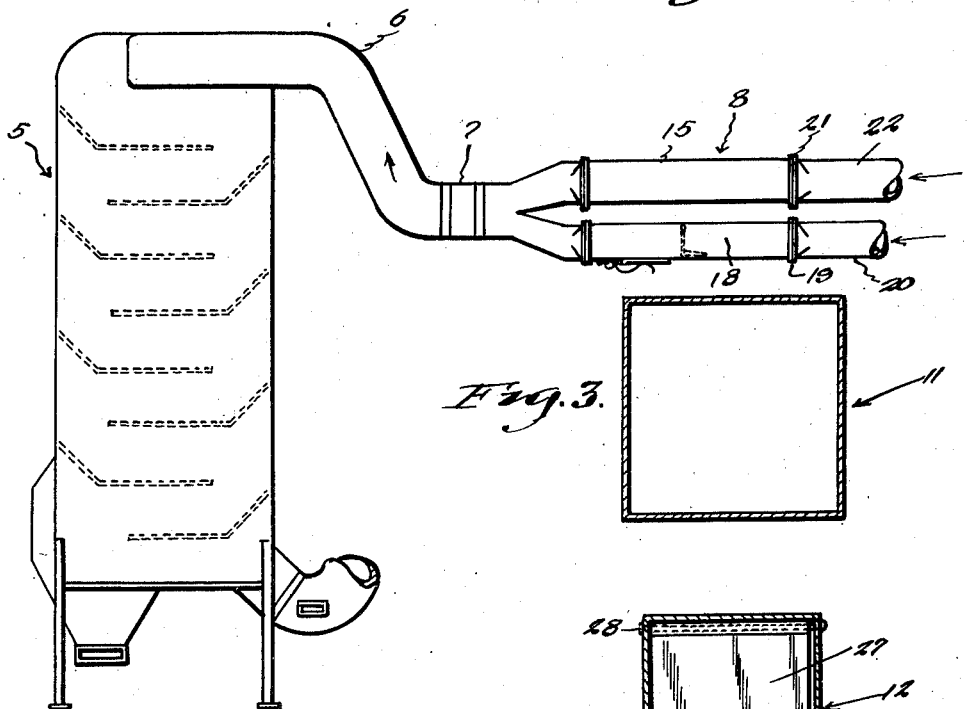
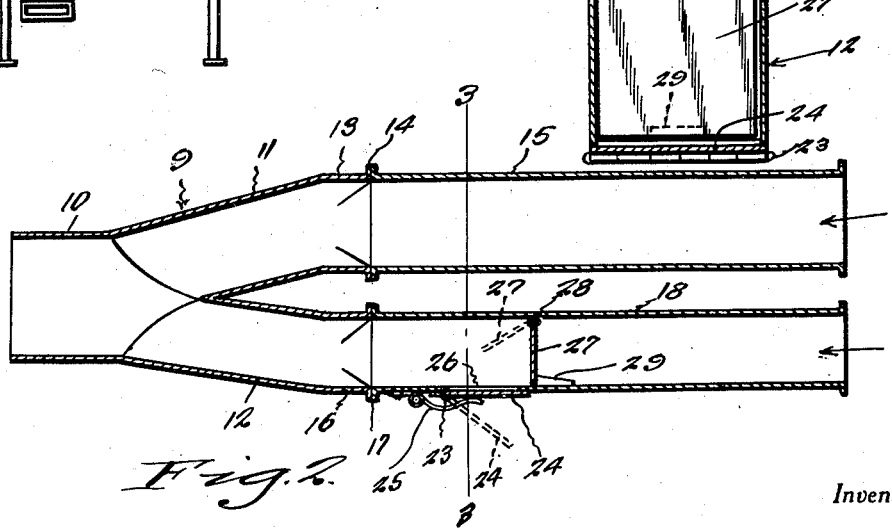
Inventor
Robert M. Joyce
By Clarence A. O'Brien
and Hyman Berman
Attorneys Patented Feb. 13, 1940

2,190,565

UNITED STATES PATENT OFFICE 2,190,565

SLIP-STREAM MIXER

Robert M. Joyce, Greenville, Miss.

Application February 10, 1939, Serial No. 255,790

3 Claims. (Cl. 34—37)

My invention relates generally to means for mixing heated air and cotton in conjunction with a cotton drying system employing a heated air blower fan, and a fan operating to take cotton directly from the source of supply into the drying tower of the system, and an important object of my invention is to provide means whereby the back pressure usually arising at the point of mixing of the cotton and the air is reduced, and uninterrupted flow of cotton and air to the inlet of the tower at a minimum velocity and at maximum of static pressure, and in this way to eliminate the fire hazard usually associated with apparatus of this type, wherein a danger of blowing cotton back through the hot air line into the heater develops whenever there is no breakage or slippage on the hot air fan.

Important objects and advantages of the present invention will be apparent from a reading of the following description taken in connection with the drawing, wherein for purposes of illustration I have set forth a preferred embodiment of my invention.

In the drawing:

Figure 1 is a general side elevational view of a slip-stream mixer operatively connected in seating relation to a conventional type of cotton drying tower.

Figure 2 is an enlarged longitudinal vertical sectional view taken through the mixer.

Figure 3 is an enlarged transverse vertical sectional view taken through Figure 2 approximately on the line 3—3.

Referring in detail to the drawing, the numeral 5 generally designates the cotton drying tower which has the hot air and cotton intake conduit 6 which is coupled as indicated by the numeral 7 to the mixer of the present invention which is generally designated 8.

The mixer 8 comprises the Y-conduit 9 which has a cylindrical portion 10 from which the squared legs 11 and 12, respectively, diverge, the cross section of the upper leg 11 being larger than that of the lower leg 12 as clearly indicated in Figure 3 of the drawing. The upper leg 11 has a deflected portion 13 which is coupled as indicated by the numeral 14 to the upper square cross section conduit 15, while the lower leg 12 has the deflected portion 16 which is square in cross section and is coupled as indicated by the numeral 17 to a square cross section horizontal conduit 18, the square conduits 15 and 18 being approximately parallel in relationship. The lower conduit 18 is connected as indicated by the numeral 19 to the hot air supply conduit 20 while the upper cotton conduit 15 is connected as indicated by the numeral 21 to the cotton supply conduit 22.

Adjacent the left hand end of the lower square conduit 18 and hinged at the point indicated by the numeral 23 is a downwardly swingable trap door 24 which is normally held up in a closed position by the spring arrangement 25, the door 24 operating to close the opening 26 in the normal position of the trap door. A gravity gate 27 is pivoted by its upper end to the top of the conduit 18 as indicated by the numeral 28 so as to fall to a vertical position in which it closes off the conduit 18 whenever the cotton fan pressure is greater than the hot air fan pressure, so that the gate 27 then assumes the straight up and down position illustrated in full lines in Figure 2 and is held in this closed position by the abutment 29 on the floor of the conduit 18.

In view of the arrangement described above it is obvious that the gravity operable gate 27 falls to a closed position from the open position shown in dotted lines in Figure 2 which is normal during the full action of the hot air fan, to the full line position shown in Figure 2, upon a substantial reduction in the action of the hot air fan, at the instant that the reduction takes place, thereby preventing the cotton seed from being blown back through the conduit 18 and to the heater so as to present a fire hazard. At the instant that the gate 27 closes, the trap door 24 is opened by the air pressure and cotton pressure, so that the cotton is released onto the floor below the mixer or into a container if one be provided, so that this cotton can be recovered and does not present any fire hazard. It is obvious from an inspection of the smooth uninterrupted and unimpeded surfaces provided by the relatively straight conduits involved in the mixer of the present invention, that the cotton and air have free and uninterrupted flow with the minimum of retardation, and that because of this the cotton can be made to move at a low speed with great uniformity.

Although I have shown and described herein a preferred embodiment of my invention, it is to be definitely understood that I do not desire to limit the application of my invention thereto, and any change or changes may be made in the materials, and in the structure and arrangement of the parts, within the spirit of the invention and the scope of the subjoined claims.

Having described the invention, what is claimed as new is:

1. In combination with the cotton intake conduit of the cotton drying tower of a cotton drying system embodying a source of damp cotton under air pressure and a source of hot air under pressure, of a mixer, said mixer comprising a Y-conduit comprising a first leg to which the source of damp cotton and air under pressure is connected, and a second leg to which the source of hot air is connected, means in said second leg operative upon failure of the hot air pressure supply to close off said second leg between said intake conduit and said hot air pressure supply whereby the cotton is prevented from passing to said hot air supply.

2. In combination with the cotton intake conduit of the cotton drying tower of a cotton drying system embodying a source of damp cotton under air pressure and a source of hot air under pressure, of a mixer, said mixer comprising a Y-conduit comprising a first leg to which the source of damp cotton and air under pressure is connected, and a second leg to which the source of hot air is connected, means in said second leg operative upon failure of the hot air pressure supply to close off said second leg between said intake conduit and said hot air pressure supply whereby the cotton is prevented from passing to said hot air supply, and a cotton escape in said second conduit operative upon closing of the first mentioned means to permit the cotton to escape from said second leg at a point in advance of said first mentioned means.

3. In combination with the cotton intake conduit of the cotton drying tower of a cotton drying system embodying a source of damp cotton under air pressure and a source of hot air under pressure, of a mixer, said mixer comprising a Y-conduit comprising a first leg to which the source of damp cotton and air under pressure is connected, and a second leg to which the source of hot air is connected, means in said second leg operative upon failure of the hot air pressure supply to close off said second leg between said intake conduit and said hot air pressure supply whereby the cotton is prevented from passing to said hot air supply, and a cotton escape in said second conduit operative upon closing of the first mentioned means to permit the cotton to escape from said second leg at a point in advance of said first mentioned means, the first means comprising a gravity operated swingable gate, and said cotton escape comprising a spring closed trap door.

ROBERT M. JOYCE.